US006909804B2

United States Patent
Caruso et al.

(10) Patent No.: US 6,909,804 B2
(45) Date of Patent: Jun. 21, 2005

(54) IMAGE COMPRESSION USABLE WITH ANIMATED IMAGES

(75) Inventors: Robert M. Caruso, Beaverton, OR (US); Konstantin J. Balashov, Beaverton, OR (US)

(73) Assignee: Marger Johnson & McCollom, P.C., Portland, OR (US)

( * ) Notice: Subject to any disclaimer, the term of this patent is extended or adjusted under 35 U.S.C. 154(b) by 798 days.

(21) Appl. No.: 09/771,360

(22) Filed: Jan. 26, 2001

(65) Prior Publication Data

US 2005/0008224 A1 Jan. 13, 2005

Related U.S. Application Data

(60) Provisional application No. 60/230,043, filed on Sep. 1, 2000, provisional application No. 60/199,781, filed on Apr. 26, 2000, and provisional application No. 60/178,482, filed on Jan. 27, 2000.

(51) Int. Cl.[7] .................................................. G06K 9/00
(52) U.S. Cl. ...................................... 382/166; 382/243
(58) Field of Search ................................ 382/166, 164, 382/162, 173, 238, 239, 240, 243; 345/423, 600

(56) References Cited

U.S. PATENT DOCUMENTS

| | | | | |
|---|---|---|---|---|
| 5,307,088 A | * | 4/1994 | Inuzuka et al. | 345/600 |
| 5,796,864 A | * | 8/1998 | Callahan | 382/166 |
| 5,859,926 A | * | 1/1999 | Asahi et al. | 382/166 |
| 5,933,249 A | * | 8/1999 | Shimura et al. | 382/239 |
| 6,038,346 A | * | 3/2000 | Ratnakar | 382/239 |
| 6,118,552 A | * | 9/2000 | Suzuki et al. | 382/166 |
| 6,300,959 B1 | * | 10/2001 | Gabler et al. | 345/473 |
| 6,327,383 B2 | * | 12/2001 | Todoroki | 382/166 |
| 6,512,793 B1 | * | 1/2003 | Maeda | 375/240.08 |
| 6,542,631 B1 | * | 4/2003 | Ishikawa | 382/162 |
| 6,553,150 B1 | * | 4/2003 | Wee et al. | 382/243 |
| 6,587,583 B1 | * | 7/2003 | Kurzweil et al. | 382/164 |
| 6,611,620 B1 | * | 8/2003 | Kobayashi et al. | 382/166 |
| 2002/0064313 A1 | * | 5/2002 | Cheng | 382/239 |

* cited by examiner

Primary Examiner—Yon J. Couso
(74) Attorney, Agent, or Firm—Marger Johnson & McCollom

(57) ABSTRACT

To compress an image, each pixel is considered. The color of each pixel, represented as an index into a color palette, is compared with the color of the pixel's upper and left neighbors and encoded to an entry in the color palette. A probability distribution is updated based on the colors of the pixel and its left and upper neighbors. Once all pixels are encoded, the color palette is optimized using the probability distribution, and the indices into the color palette for the pixels are compressed. In the preferred embodiment, the compression is achieved using a single pass over the pixels in the image, and the probability distribution is updated dynamically as each pixel is compressed.

40 Claims, 16 Drawing Sheets

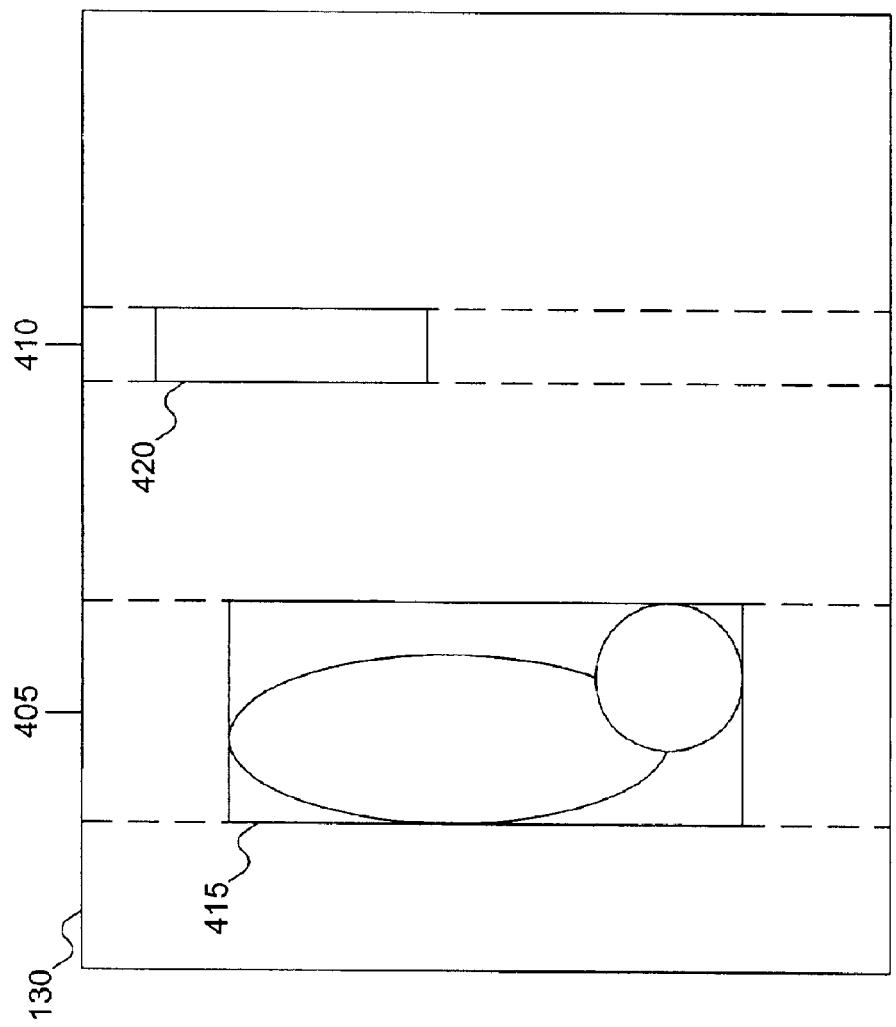

IMAGE COMPRESSION USABLE WITH ANIMATED IMAGES

RELATED APPLICATION DATA

This application claims priority from U.S. Provisional Patent Application Ser. No. 60/178,482, titled "NETWORK SEARCHING WITH SCREEN SNAPSHOT SEARCH RESULTS," filed Jan. 27, 2000, U.S. Provisional Patent Application Ser. No. 60/199,781, titled "NETWORK SEARCHING WITH SCREEN SNAPSHOT SEARCH RESULTS AND RICH CONTENT FILES WITH SELF-CONTAINED VIEWER," filed Apr. 26, 2000, and U.S. Provisional Patent Application Ser. No. 60/230,043, titled "IMAGE COMPRESSION TECHNIQUE FOR USE WITH ANIMATED IMAGE FILES," filed Sept. 1, 2000.

FIELD OF THE INVENTION

This invention pertains to compression techniques on a computer, and more particularly to a lossless compression technique usable with digital color images, including animated images.

BACKGROUND OF THE INVENTION

File compression technology has recently experienced a resurgence. Originally, file compression was necessary because disk space was limited. To maximize the number of files that could be stored on a disk, it was occasionally necessary to compress files. More recently, hard disk space has become very cheap, and users have been able to store massive quantities of data. The need for compression to save disk space has diminished.

At the same time that disk space has become cheap, however, another bottleneck has arisen: throughput. Although people enjoy the freedom the Internet gives them, in terms of research and file transfer, most people use limited throughput connections to the Internet. For example, at 56 Kbps, to transfer a 1 MB file takes approximately 2 minutes and 26 seconds. A single image file, storing a 1024×768 image in true color, taking up 2.25 MB of space, requires 5 and a half minutes to download. Multiply that time by several files, and the transfer times become a serious problem.

One technique used to reduce the size of the file is to limit the number of colors used in the image. There are two reasons why including a large number of colors in an image is impractical or unnecessary. First, the computer hardware on which the image is displayed (i.e., the monitor and video card) might be limited in the number of colors that can be displayed at one time. Second, the human eye is limited in the number of colors it can distinguish when looking at an image. To address these concerns, a typical image uses a color palette, which includes either a subset of the colors in the image or approximations of the colors in the image. The number of entries in the color palette determines the number of different colors that occur in the image. In the preferred embodiment of the invention, the color palette of the image includes 256 colors, but a person skilled in the art will recognize that this number can vary. The Median Cut or a similar algorithm can be used to select the colors stored in the color palette. The specifics of how the colors are selected for the color palette is not relevant to the invention and will not be discussed here.

Using a color palette begins the process of compressing the image. For example, if the image is stored using 24-bit color, it takes three bytes to store the color for each pixel. If only 256 colors are used and stored in the color palette, the color for each pixel can be represented using only one byte: the index into the color palette. This reduces the size of the image file by two thirds.

Further compression is also possible. For example, instead of using one byte to identify the index into the color palette for a pixel, a Huffman coding can be applied to the indices into the color palette for the pixels. In a Huffman coding, the frequencies for each symbol (in this case, the different colors in the color palette) in the message (in this case, the image) are calculated. The entire image is scanned, and the number of times each color is counted is scanned. The frequency for each color can then be determined by dividing the number of occurrences of each color by the total number of pixels in the image.

Once the frequencies of each symbol in the message are known, a Huffman tree can be constructed. FIG. 10 shows the construction of the Huffman tree. In FIG. 10, there are four symbols, "A," "B," "C," and "D," with the respective frequencies of 0.10, 0.20, 0.30, and 0.40. The frequencies start out as leaves 1005, 1010, 1015, and 1020 in a to-be-constructed tree. The two smallest frequencies are assigned a common parent node in the tree, and the parent node is assigned a frequency equal to the sum of its children. In FIG. 10, the two smallest frequencies are 0.10 and 0.20, which combine to a parent node frequency of 0.30. The process then repeats, using the parent node's frequency in place of its two children, until only a single (root) node remains.

Once the Huffman tree is constructed, the two children of each parent node are assigned a "0" or a "1", depending on whether they are a "left" or a "right" branch from the parent node. (A person skilled in the art will recognize that the determination of which branch is "left" and which is "right" is arbitrary.) The Huffman coding for each symbol is the sequence of branches from the root node of the Huffman tree to the leaf for that symbol. For example, the Huffman coding for symbol "D" is "1", whereas the Huffman coding for symbol "B" is "001."

The advantage of Huffman coding is that symbols that occur frequently are assigned shorter codes than symbols that occur infrequently. As can be seen from the example of FIG. 10, the symbol "D" occurs 40% of the time in the message, whereas symbol "B" occurs only 20% of the time. Because there are more occurrences of the symbol "D," a shorter code for the symbol "D" as compared with symbol "B" will result in a shorter message.

There are two problems with using a Huffman coding as described above. First, the image must be scanned twice: once to determine the Huffman codes, and once to compress the image. Huffman coding cannot be determined while scanning the image. Second, because the coding is necessary to determine the appropriate color for each pixel, the coding must be stored in the compressed image file.

Other techniques exist to compress images: for example JPEG (Joint Photographic Expert Group) and MPEG (Motion Picture Expert Group) compression. These techniques allow for fast compression and decompression. But JPEG and MPEG compression techniques arc lossy: that is, they achieve high fast compression rates by losing information. Typically, the loss is imperceptible: for example, with still images compressed using JPEG compression, the lost information is typically below the level of perception of the human eye. But often, the user cannot afford to lose information from the image that needs to be compressed. For such images, JPEG and MPEG compression is useless.

Accordingly, a need remains for a way to compress digital images that addresses these and other problems associated with the prior art.

SUMMARY OF THE INVENTION

BRIEF DESCRIPTION OF THE DRAWINGS

FIG. 4A shows the image file of FIG. 2 being divided into boxes for compression on the computer system of FIG. 1A.

Appendix A shows an implementation of the compression algorithm described herein, implemented in the C programming language and including comments.

DETAILED DESCRIPTION

Figure 1A:
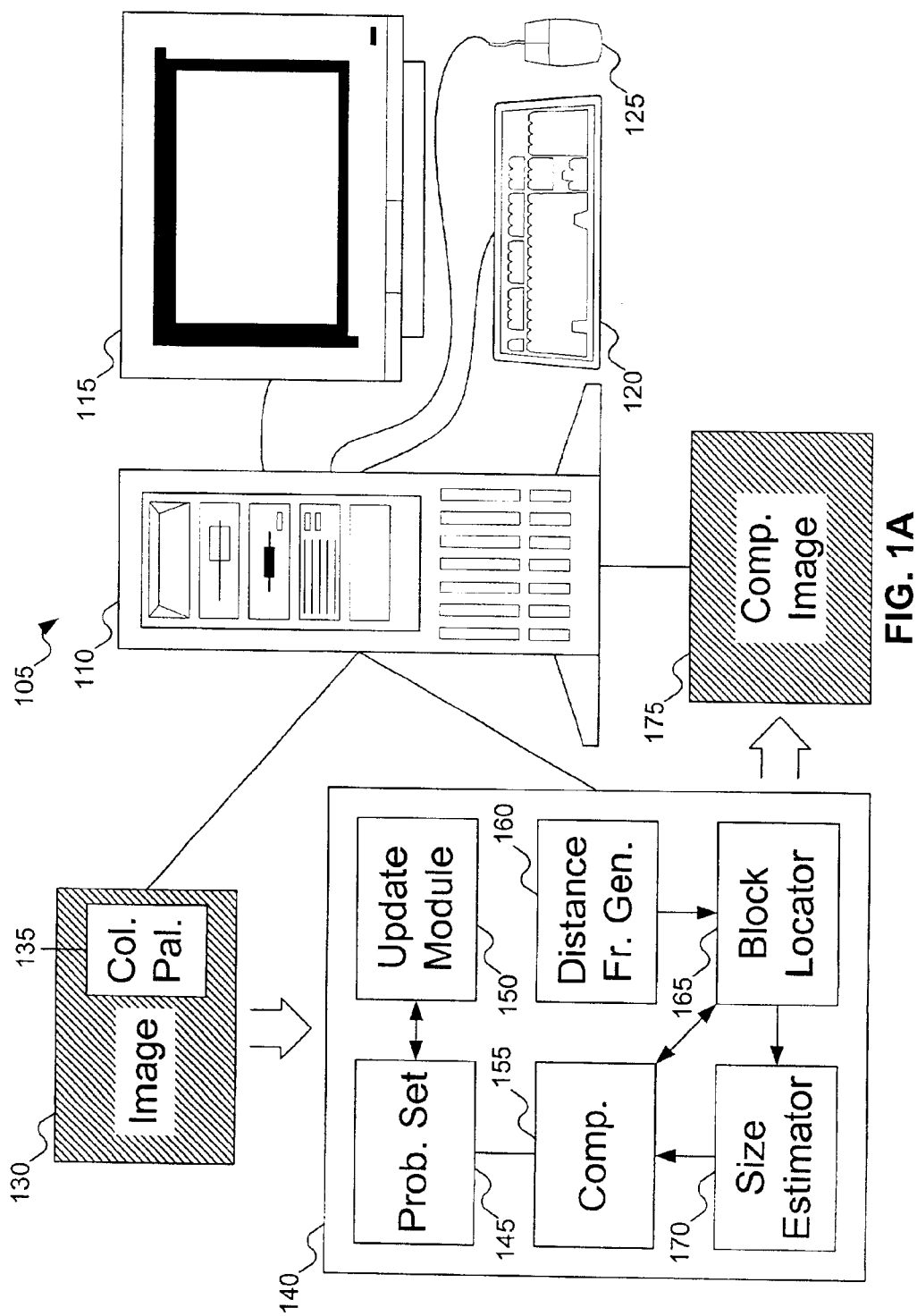
FIG. 1A shows a computer system designed to compress an image file according to an embodiment of the invention.

FIG. 1A shows a computer system 105 in accordance with the invention. Computer system 105 includes a computer 110, a monitor 115, a keyboard 120, and a mouse 125. Computer 110 includes hardware components, such as a processor 105, a memory 130, and a branch prediction apparatus (not shown). Computer system 105 may also include other equipment not shown in FIG. 1A, for example, other input/output equipment or a printer.

Computer system 105 stores image 130. Typically, image 130 is loaded into the memory of computer system 105. A person skilled in the art will recognize that image 130 can be accessed in various ways: for example, over a network connection or from a scanner (not shown). Image 130 includes color palette 135, which specifies the colors used to display image 130.

Software 140 is installed in computer system 105. Software 140 includes probability set 145, update module 150, compressor 155, distance frame generator 160, block locator 165, and size estimator 170. Probability set 145 includes at least one model, and can possibly include multiple models, which can be used to predict the likelihood of the next pixel having a color that matches its left or upper neighbors. Update module 150 is responsible for updating probability set 145 based on the actual colors of the pixel and its left and upper neighbors. Update module 150 can also select a different model from probability set 145, if needed. (Probability set 145 and update module 150 will be discussed further with reference to FIG. 3, below.) Compressor 155 is responsible for encoding/decoding the color of the current pixel. Distance frame generator 160 is responsible for generating distance frames between two frames of an animated image file. (Distance frame generator 160 is not used when an image file is static.) Block locator 165 is responsible for locating blocks within image 130 that are different from the background color of the image. Size estimator 170 is responsible for estimating the size of compressed image file 175 using different blocks located by block locator 165.

Compressor 155 uses the size estimations calculated by size estimator 170 to select the tessellation of the image (or the image frame) that will produce the smallest file size. Compressor 155 then uses compresses each block in the tessellation with the smallest file size for the image (or image frame). This compression uses the probability values in probability set 145.

Figure 1B:
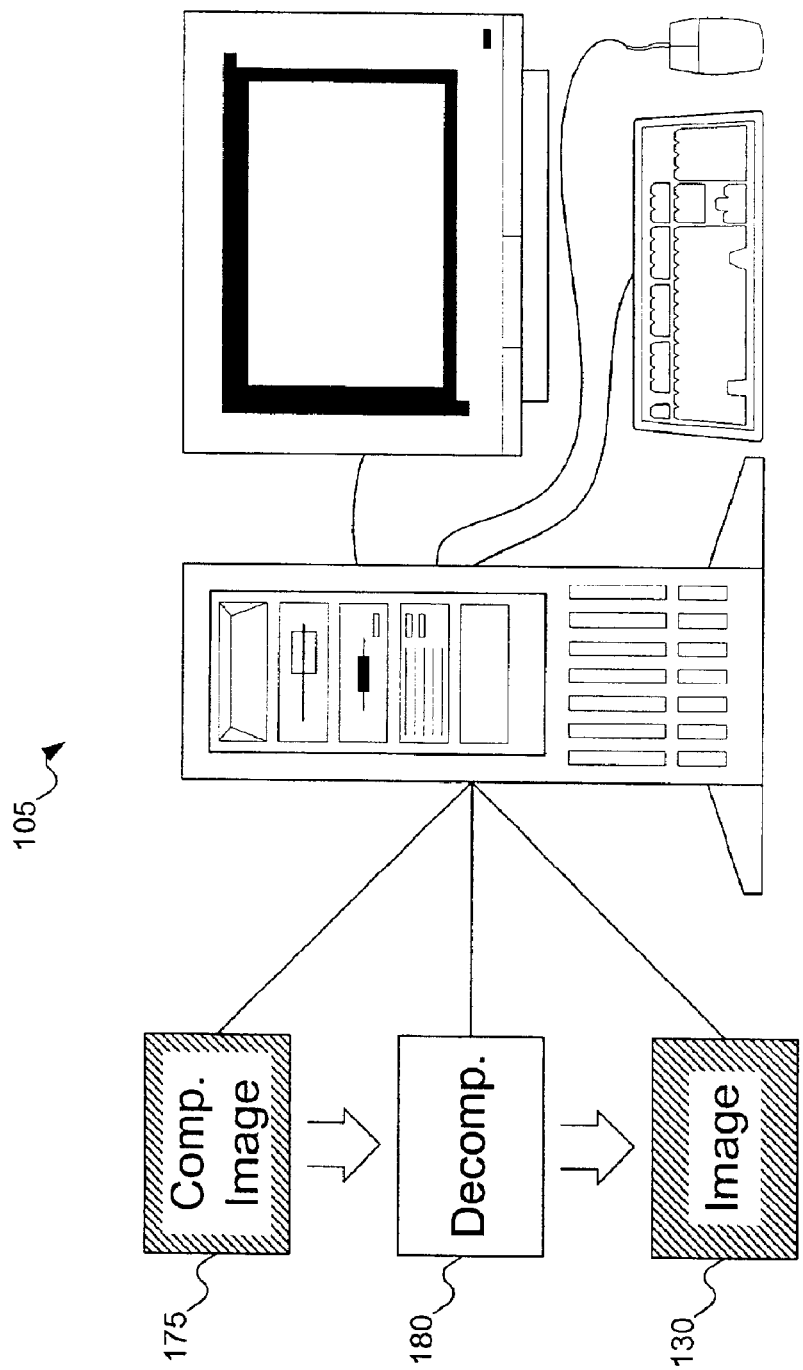
FIG. 1B shows a computer system designed to decompress an image file according to an embodiment of the invention.

In FIG. 1B, computer system 105 includes decompressor 180. Decompressor 180 is responsible for decompressing compressed image file 175. Since the contents of compressed image file 175 contain all the data of the image, decompressor 180 can completely reconstruct original image file 130 from compressed image file 175.

Figure 1C:
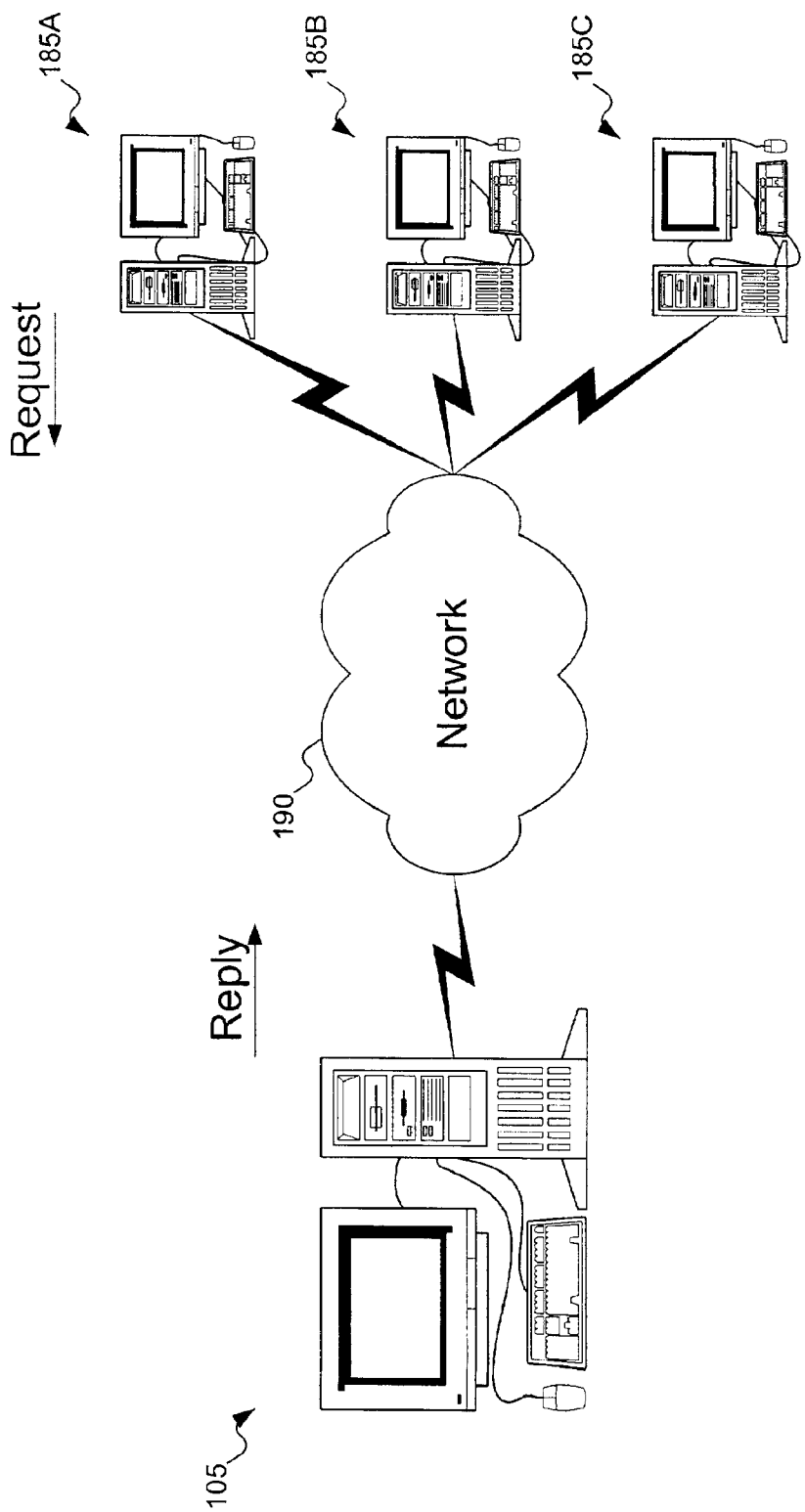
FIG. 1C shows two computers as shown in FIGS. 1A and 1B connected via a network for transferring a compressed image file.

FIG. 1C shows two computers connected via a network for transferring a compressed image file. In FIG. 1C, computer system 105 stores a compressed image file. Other computer systems, such as computer systems 185A, 185B, and 185C, are like computer system 105 and can make requests for the image file from computer system 105. The compressed image file is then transferred over network 190 to the requesting computer, which can then decompress compressed image file 175 to reproduce original image file 130.

A person skilled in the art will recognize that, although a network is shown in FIG. 1C, there are other ways of transferring the compressed image file from computer system 105 to computer systems 185A, 185B, and 185C. For example, the compressed image file can be placed on a computer-readable medium, such as a floppy disk or compact disc (CD), and physically transferred to the destination computer system. In addition, there are many different types of networks over which the compressed image file can be transferred: for example, local area networks (LANs), wide-area networks (WANs), a global internetwork, wireless networks, and so on.

Figure 2:
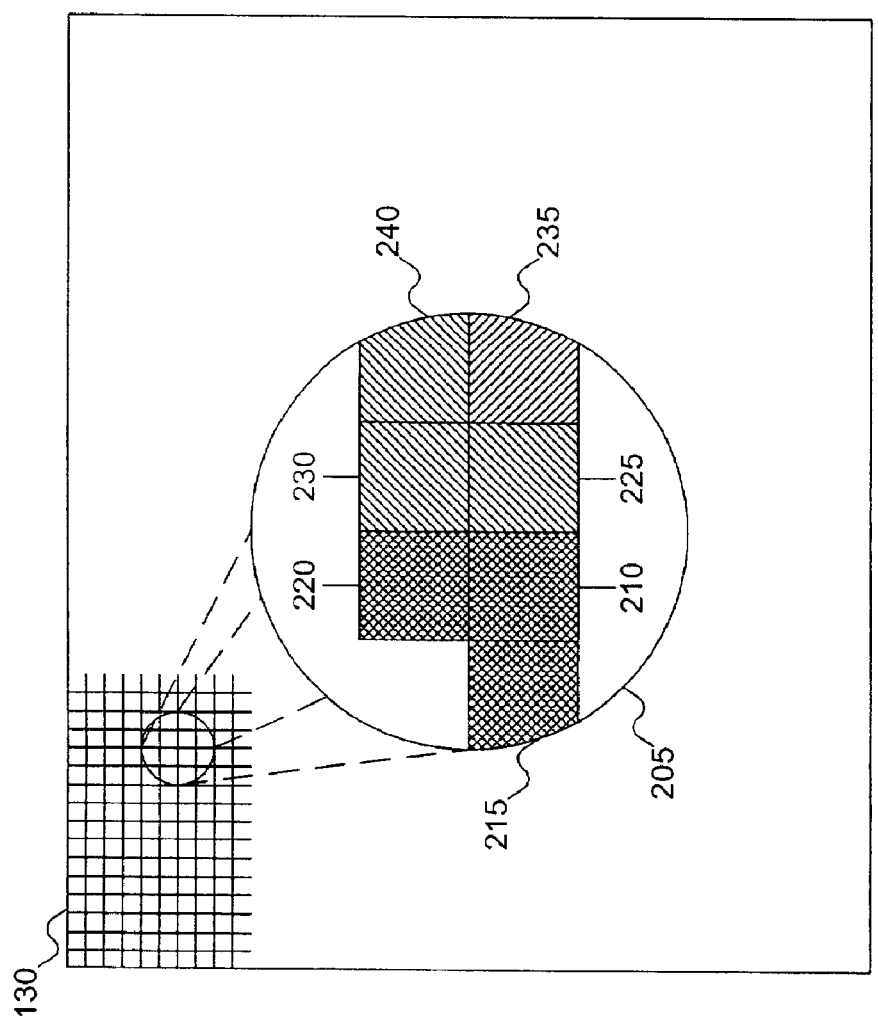
FIG. 2 shows a close-up of an image file being compressed by the computer system of FIG. 1A.

FIG. 2 shows a close-up of image file 130 being compressed by the computer system of FIG. 1A. In FIG. 2, image 130 includes a rectangular array of pixels. Close-up section 205 shows some of the pixels in image 130 more closely. For example, pixel 210 has left neighbor 215 and upper neighbor 220. Left neighbor 215 and upper neighbor 220 have the same color (represented by the cross-hatch pattern), and pixel 210 has the same color. In contrast, pixel 225 has the same color as its upper neighbor 230, but a different color than its left neighbor 210. Pixel 235 has a color different than both its left neighbor 225 and its upper neighbor 240. A person skilled in the art will recognize other combinations of colors for a given pixel and its respective left and upper neighbors.

Figure 3:
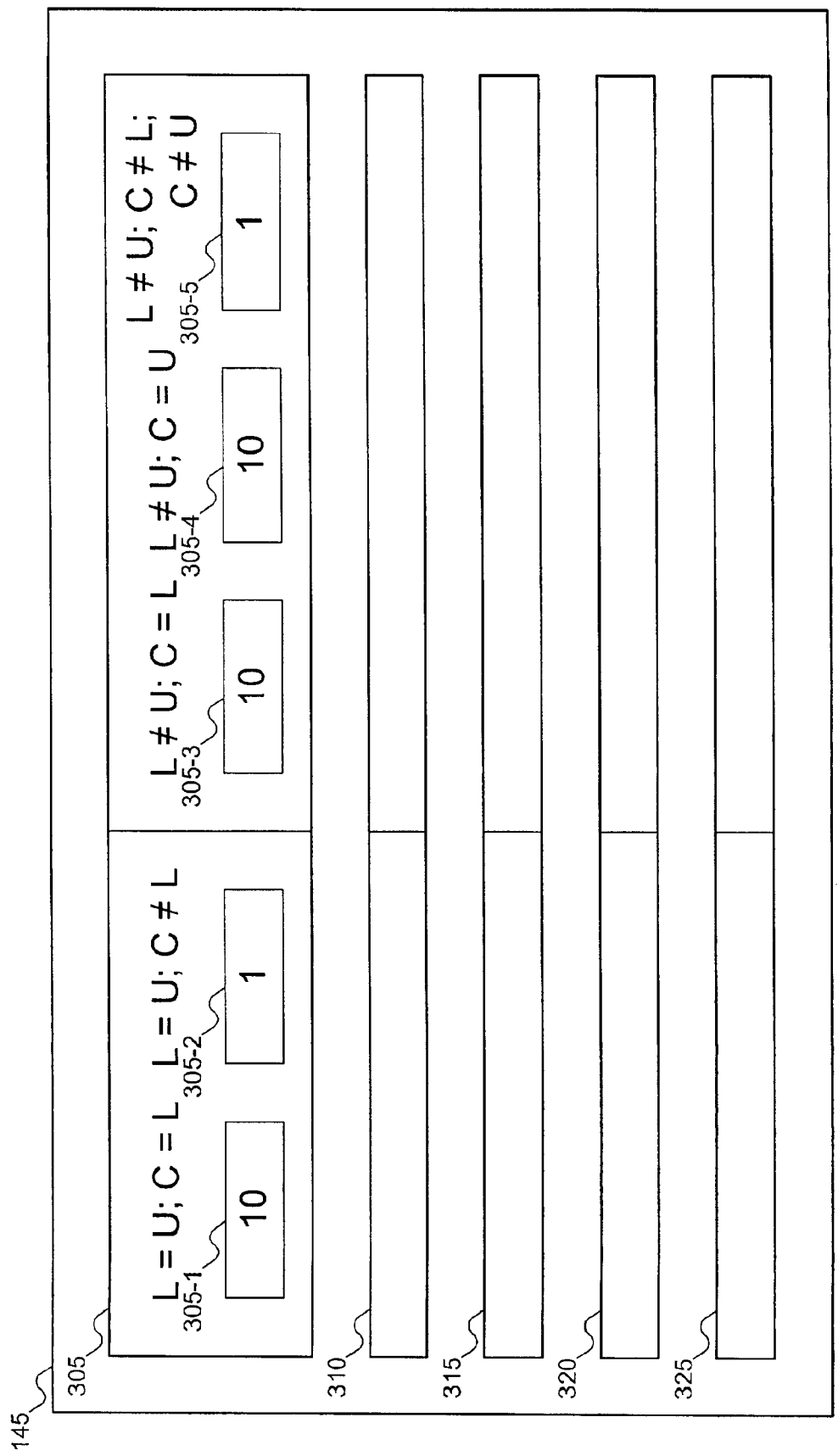
FIG. 3 shows five probability models used to compress the image of FIG. 2 on the computer system of FIG. 1A.

FIG. 3 shows why it matters what the colors of the current pixel and its left and upper neighbors are. FIG. 3 shows a probability set which includes five probability models used to compress the image of FIG. 2 on the computer system of FIG. 1A. In FIG. 3, there are five probability models 305, 310, 315, 320, and 325, but any number of models can be used. Because the details of each are similar, only the details of probability model 305 are shown in detail. Each of the probabilities 305-1, 305-2, 305-3, 305-4, and 305-5 reflects a combination of the colors of the current pixel and its left and upper neighbors; the probabilities are with the same color combinations for the left and upper neighbors. Thus, probabilities 305-1 and 305-2 are determined relative to all pixels whose left and upper neighbors have the same color, and probabilities 305-3, 305-4, and 305-5 are determined relative to all pixels whose left and upper neighbors have different colors. Probability 305-1 reflects the probability that the current pixel has the same color as both its left and upper neighbors (10/11). Probability 305-2 reflects the probability that the current pixel has a different color than the left and upper neighbors, which have the same color (1/11). Probability 305-3 reflects the probability that the current pixel has the same color as its left neighbor but a different color from its upper neighbor (10/21). Probability 305-4 reflects the probability that the current pixel has the same color as its upper neighbor but a different color from its left neighbor (10/21). Probability 305-5 reflects the probability that the current pixel has a different color than either its left or upper neighbors, which have different colors (1/21).

The values shown for probabilities 305-1, 305-2, 305-3, 305-4, and 305-5 are the initial probabilities for each color combination, and are updated as the image is compressed. For example, probabilities 305-1 and 305-2 define the probabilities that the current pixel has the same color as its left and upper neighbors given that the left and upper neighbors have the same color. For example, given that the left and upper neighbors have the same color, it is initially assumed that the current pixel is ten times as likely as not to have the same color as its left and upper neighbors. As the model is updated, this probability changes.

It is important to distinguish between the terms "probability set," "probability model," and "probability." "Probability set" refers to the set of all probability models used in the compression. There can be one or more probability models in each probability set; typically, there will be only one probability set used to compress a single image file. "Probability model" refers to the set of probabilities (which can also be called probability values) used in a single probability model. Typically, each probability model will include probabilities for similar conditions. "Probability" refers to the individual probability of a given condition happening in a single probability model. So, in FIG. 3, probability set 145 includes five probability models 305, 310, 315, 320, and 325, and each probability model (such as probability model 305) includes five probabilities 305-1, 305-2, 305-3, 305-4, and 305-5, shown as initial relative values 10, 1, 10, 10, and 1, respectively.

The different probability models allow for additional history to be used in predicting the current pixel's color. In general, the behavior of the next pixel will be similar to the left and upper neighbors. Thus, if the current pixel has the same color as its upper neighbor but a different color from its left neighbor, it is expected that the next pixel will be colored relatively similarly to other pixels whose previous pixel has the same color as its upper neighbor but a different color from its left neighbor.

Just as the colors of the left and upper neighbors select which probability to use within a probability model, the colors of the left and upper neighbors can be used to select the next probability model to use. For example, given that the left and upper neighbors of the current pixel are the same color and the current pixel has the same color, probability model 305 can be used in determining the probability of the next pixel's color. Or, given that the left and upper neighbors of the current pixel have different colors and the current pixel has the same color as the upper neighbor, probability model 320 can be used in determining the probability of the next pixel's color. By changing probability models, each probability model tends to become focused on one probability value, which improves compression. In the preferred embodiment, one model is used after one of the five probabilities occurs: that is, probability model 305 is used after the current pixel has the same color as both its left and upper neighbors, probability model 310 is used after the left and upper neighbors have the same color, but the current pixel has a different color, probability model 315 is used after the left and upper neighbors have different colors, and the current pixel has the same color as its left neighbor, probability model 320 is used after the left and upper neighbors have different colors, and the current pixel has the same color as its upper neighbor, and probability model 325 is used after the left and upper neighbors have different colors, and the current pixel has a different color than either its left or upper neighbor.

Update module 150 from FIG. 1 updates the individual probabilities of the probability models in the probability set. For example, assume that probability model 305 is currently being used, and the current pixel has the same color as its left neighbor, but not its upper neighbor. In this case, update module 150 updates probability 305-3. Update module 150 can also select the probability model to use with the next pixel: in this case, probability model 315.

FIG. 4A shows the image file of FIG. 2 being divided into boxes for compression on the computer system of FIG. 1A. In the example shown in FIG. 4A, image 130 includes two curved shapes and a rectangle. First, image 130 is scanned to determine a background color. This is done by analyzing the border of the image. If there is a color that predominates the border of the image, this color is selected as the background color. Then, to divide image 130 into boxes, the image is scanned to determine vertical stripes in which pixels appear that differ from the background color. Two such stripes are present in FIG. 4A: stripe 405 and stripe 410. Each stripe is then divided into boxes, such that each horizontal row of pixels in the box includes at least one pixel with a color different from the background color. This forms boxes 415 and 420. Boxes 415 and 420 can then be compressed individually, with the remaining pixels in image 130 colored with the background color.

A person skilled in the art will recognize that, although the stripes were first located vertically and the boxes then formed horizontally, this is not the only way the boxes can be formed. For example, horizontal stripes can be formed first, and then boxes by analyzing the horizontal stripes. In addition, although there are advantages to rectangular image shapes, the boxes do not have to be rectangular in shape. Indeed, any shape can be used to define a box. The advantage of the rectangle is its simplistic definition: only a starting point and dimensions are required to define a rectangular box.

In the preferred embodiment, boxes are located by analyzing the image for stripes both horizontally and vertically. The size of the compressed file is estimated using both horizontal and vertical striping, and the striping that produces the smaller file size is selected. This comparison is discussed further below with reference to FIG. 4B.

Figure 4B:
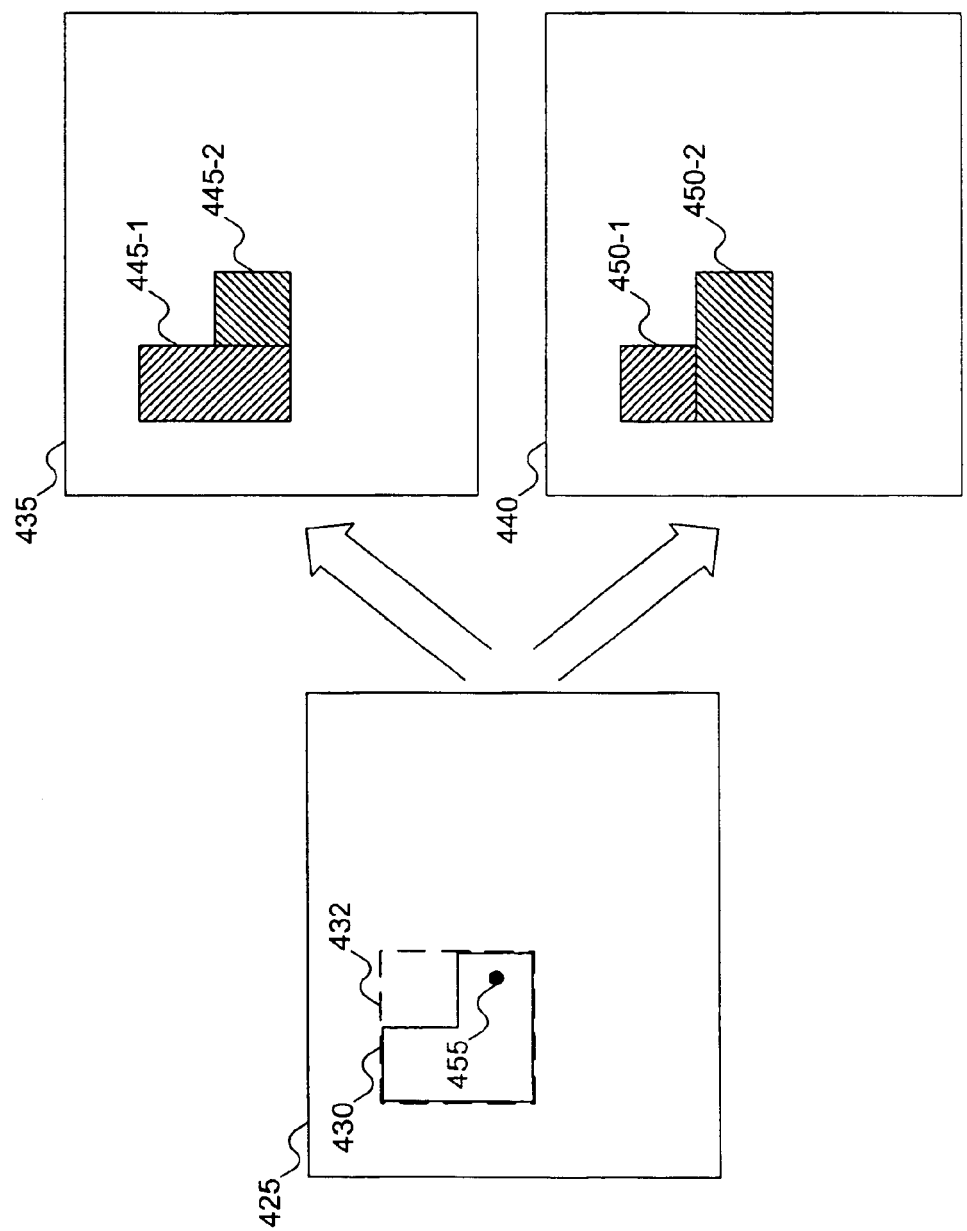
FIG. 4B shows an image file divided into two different tessellations on the computer system of FIG. 1A for compression.

FIG. 4B shows an image divided into two different tessellations on the computer system of FIG. 1A for compression. In FIG. 4B, image 425 includes one L-shaped object 430. (Object 430 can be thought of as an approximation of the elliptical objects in box 415 of FIG. 4A.) Although object 430 could be enclosed by box 432, there are other ways to divide image 425. Instead, image 425 can be tessellated into rectangular boxes, and each box compressed separately. Two different tessellations are shown in images 435 and 440, respectively showing the boxes found when the first stripes are located vertically and horizontally. (The shading in images 435 and 440 are only used to show the different tessellations, and are not meant to represent different colors.) Depending on which tessellation from in images 435 and 440 are selected, either boxes 445-1 and 445-2, or boxes 450-1 and 450-2, can be compressed according to the preferred embodiment of the invention.

The tessellations shown in images 435 and 440 may result in a smaller file size for the compressed image file. For example, if object 430 includes only one color (ignore for the moment dot 455), compressing box 432 would include two colors, and compression according to the preferred embodiment of the invention would be necessary. On the other hand, boxes 445-1 and 445-2, or boxes 450-1 and 450-2, would each include only one color, and thus can be specified with only a location, size, and color.

Although when dot 455 is ignored the two tessellations would result in compressed files of identical size, including dot 455 can make a difference. The box that includes dot 455 is compressed using the preferred embodiment of the invention, rather than just storing a location, size, and color. When dot 455 is included, image 435 has an advantage, since box 445-2, which includes dot 455, is smaller than box 450-2 in image 440, and hence box 445-2 would compress to a smaller file size.

Figure 5A:
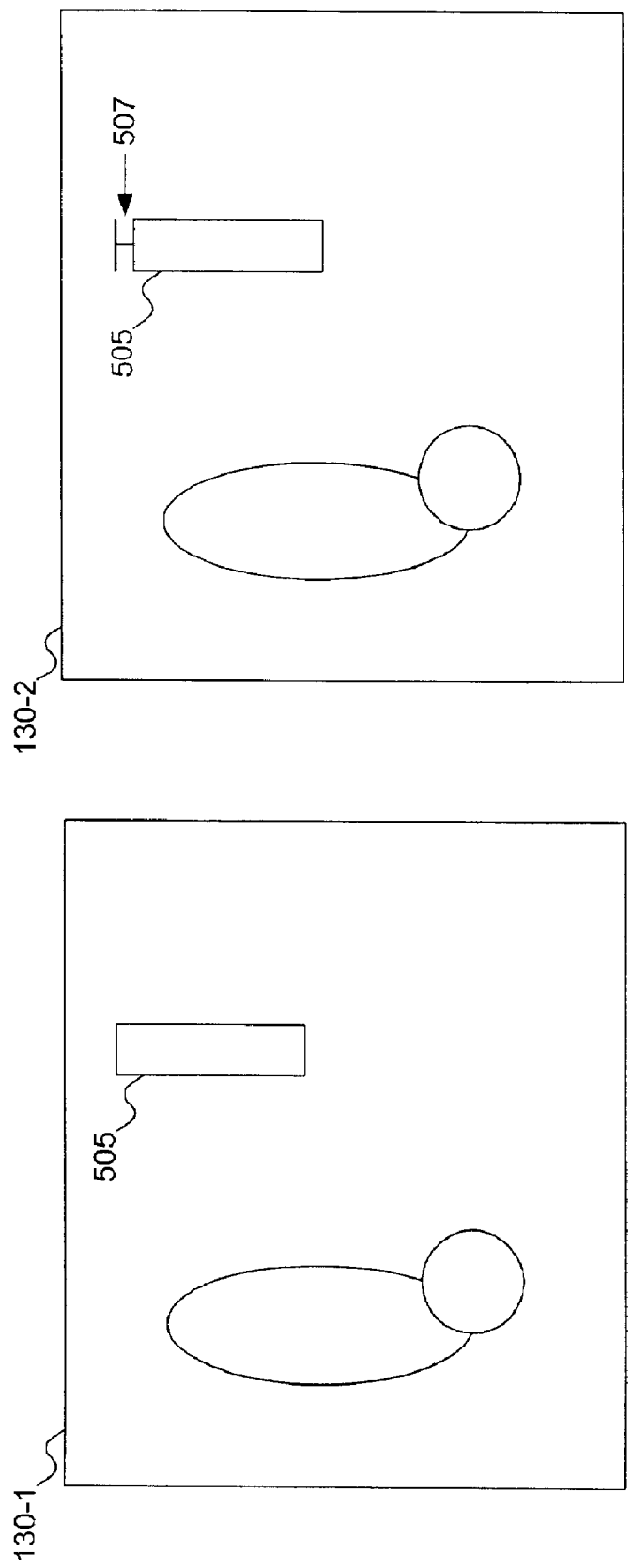
FIGS. 5A and 5B show an animated image file being analyzed to determine a distance frame to compress the animated image file on the computer system of FIG. 1A.
Figure 5B:
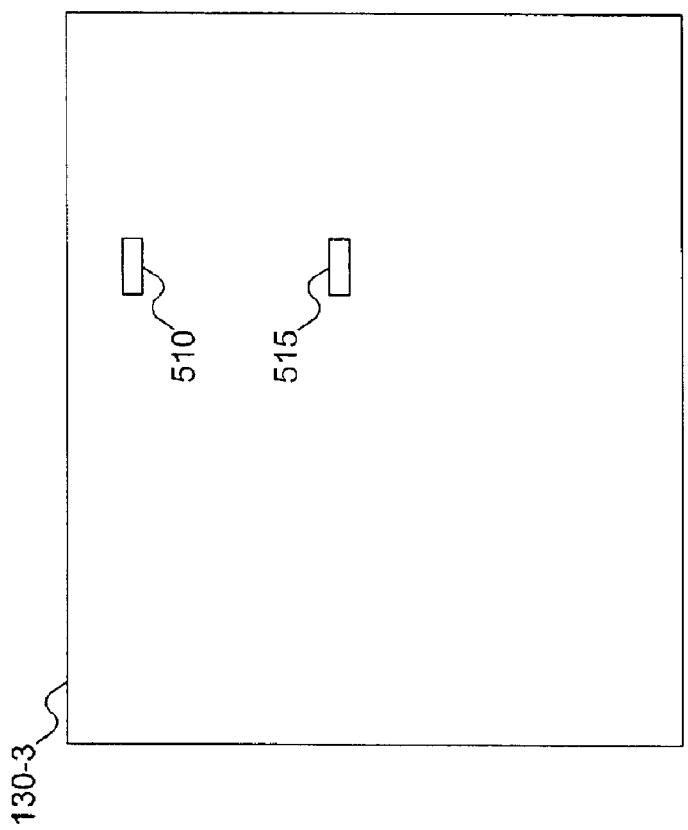

FIGS. 5A and 5B show an animated image file being analyzed to determine a distance frame to compress an animated image file on the computer system of FIG. 1A. In FIG. 5A, image frames 130-1 and 130-2 are consecutive frames from the animated image file. Although each frame can be analyzed as described above with reference to FIG. 4A and compressed, this approach might not result in the best possible compression. For example, consider the change between image frames 130-1 and 130-2. Careful inspection will reveal that the only change between image frames 130-1 and 130-2 is that rectangle 505 has moved downward slightly, as indicated by arrow 507. By "subtracting" the image frame 130-1 from image frame 130-2, a distance frame can be computed. This difference is shown in FIG. 5B as distance frame 130-3. Box 510 has changed from the color of rectangle 505 to the background color of the animated image, and box 515 has changed from the background color to the color of rectangle 515. It should be apparent that compressing boxes 510 and 515 of distance frame 130-3 would require less space than compressing image frame 130-2. When it becomes necessary to display image frame 130-2, distance frame 130-3 can be decoded, and only the pixels that have changed from image frame 130-1 need to be redisplayed.

Where animated images are used, the preferred embodiment analyzes each frame four different ways. First, as discussed above, the size of each compressed frame is estimated using horizontal and vertical striping. Then the distance frame between the current frame and the previous frame of the animated image is calculated, and size estimations are calculated using horizontal and vertical striping on the distance frame.

Figure 6A:
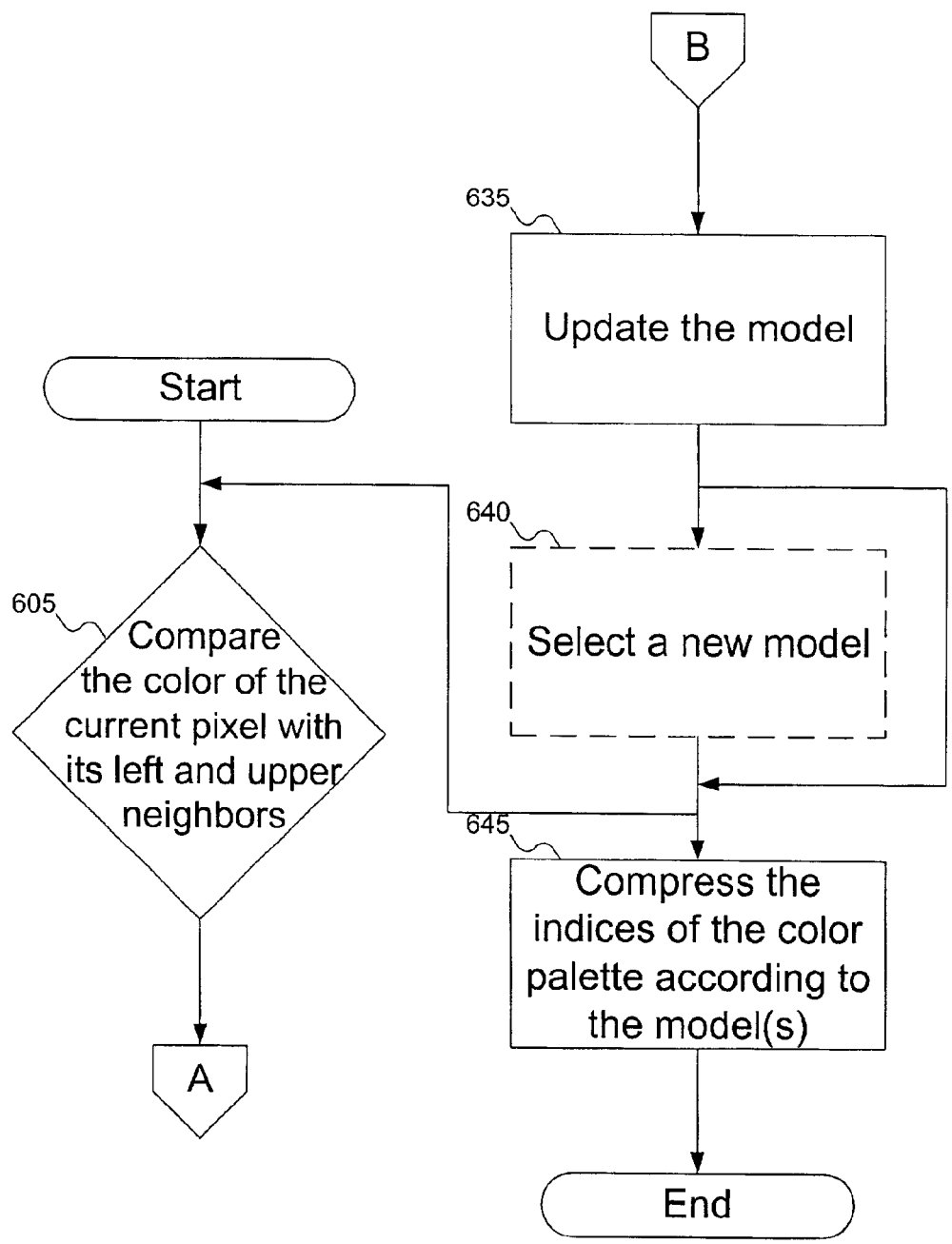
FIGS. 6A and 6B show the procedure used to compress the image file of FIG. 2 on the computer system of FIG. 1A.
Figure 6B:
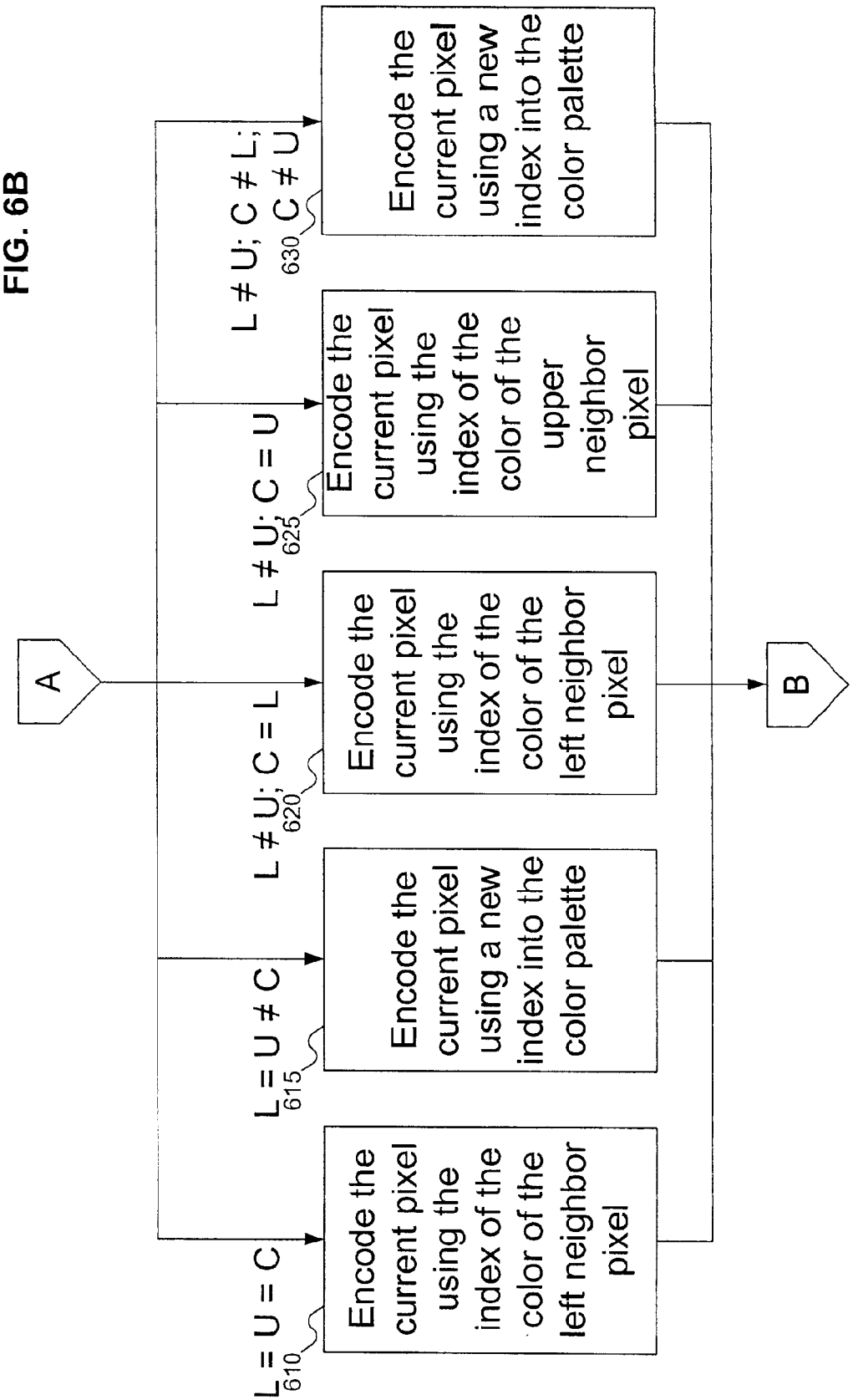

FIGS. 6A and 6B show the procedure used to compress the image file of FIG. 2 on the computer system of FIG. 1A.

At step 605, the color of the current pixel is compared with the colors of the current pixel's left and upper neighbors. Depending on the colors of the current pixel and its left and upper neighbors, the appropriate probability value (and, if necessary, the color of the current pixel) is encoded at the applicable one of steps 610, 615, 620, 625, or 630 (FIG. 6B). At step 635 (FIG. 6A) the model is updated. If multiple models are being used, at step 640 a new model is selected. If there are pixels remaining to he compressed, the procedure returns to step 605 for another pixel. Otherwise, at step 645, the indices of the color palette entries are compressed according to the model(s).

The encoding performed at the applicable one of steps 610, 615, 620, 625, or 630 is performed using a range encoder. The range encoder is a variation of an arithmetic coder: the difference between an arithmetic coder and a range coder are primarily technical in nature and the distinction need not be explained here. Arithmetic coding operates by assigning each possible symbol a range of probability values between 0% and 100%. Initially, the arithmetic coding covers the entire range from 0% to 100%. Then, as an individual symbol is encountered, the range is narrowed to include only the probabilities covered by that individual symbol. The process is then repeated, applied to the sub-range established by the previous symbol.

An example can help to clarify how the compression works, using a range coder with probability already known: i.e., a static model. Consider the message "DCDACBD-CDB." The letter "A" occurs once, for a probability of 10%. Similarly, the letters "B," "C," and "D" have probabilities 20%, 30%, and 40%, respectively. The arithmetic coder can assign to the letter "A" all values between 0.0 (0%) and 0.1 (10%). Similarly, the letter "B" can be assigned all values between 0.1 and 0.3, the letter "C" values between 0.3 and 0.6, and the letter "D" values between 0.6 and 1.0. (The border between ranges for adjacent symbols can be dealt with a technical fix: for example, each range is defined to be exclusive of its upper limit, and so the value 0.1 is assigned only to the letter "B." A corollary of this definition is that the value 1.0 is excluded. A person skilled in the art will also recognize other ways this problem can be addressed.)

When the range encoder encounters the first letter ("D"), it narrows the range of acceptable encodings from 0.0 through 1.0 to 0.6 through 1.0 (since the letter "D" is assigned the range 0.6 to 1.0). Since the second letter is "C," the range is further narrowed to 0.72 through 0.84. This range is calculated by multiplying the range for the new symbol ("C") by the size of the range calculated so far (0.4, which gives the relative range of 0.12 through 0.24), and adding the resulting values to the low end of the previous range (resulting in 0.72 through 0.84). When the next symbol ("D") is encountered, the range is narrowed to 0.792 through 0.84. Table 1 shows the range of acceptable encodings after each symbol in the message is encountered.

TABLE 1

| Message | Range |
| --- | --- |
| D | 0.6 though 1.0 |
| DC | 0.72 though 0.84 |
| DCD | 0.792 though 0.84 |
| DCDA | 0.792 though 0.7968 |
| DCDAC | 0.79344 though 0.79488 |
| DCDACB | 0.793584 though 0.793872 |
| DCDACBD | 0.7937568 though 0.793872 |
| DCDACBDC | 0.79379136 though 0.79382592 |

TABLE 1-continued

| Message | Range |
| --- | --- |
| DCDACBDCD | 0.793812096 though 0.79382592 |
| DCDACBDCDB | 0.7938134784 though 0.7938162432 |

After the entire message is processed, the final range produced is 0.7938134784 though 0.7938162432. By using the single number 0.7938134784, the entire message is represented.

Decoding is accomplished by reversing the process. Again, the probabilities of the symbols in the message are known in advance. Then, the number is examined. Since it falls between 0.6 and 1.0, the first character of the message is "D." The low value for the range of the determined character (0.6) is then subtracted from the encoded value, resulting in the value 0.1938134784. This value is then divided by the size of the range for the determined character (0.4), which produces 0.484533696. Since the new value falls between 0.3 and 0.6, the next character of the message is "C." The low value for the range for the character "C" (0.3) can be subtracted, resulting in 0.184533696, and this can be divided by the size of the range for the character "C" (0.3), which produces 0.61511232. This process can be repeated, until all the characters of the message have been identified. Table 2 shows the complete message as it is decoded.

TABLE 2

| Encoded Value | Message |
| --- | --- |
| 0.7938134784 | D |
| 0.484533696 | DC |
| 0.61511232 | DCD |
| 0.0377808 | DCDA |
| 0.377808 | DCDAC |
| 0.25936 | DCDACB |
| 0.7968 | DCDACBD |
| 0.492 | DCDACBDC |
| 0.64 | DCDACBDCD |
| 0.1 | DCDACBDCDB |

The reader may wonder how this compresses the message, since 10 characters were needed to represent the encoding. This is explained by the fact that there are very few characters in the message. A longer message would show that the encoded message is shorter than the original message.

The above example shows how a message can be encoded using static probability values. As pointed out, it was assumed that the probabilities of the individual symbols in the message were known in advance.

When dynamic probability values are used in the present invention enabling single pass compression, this assumption can be discarded. Some initial probability values are assigned to each symbol. One possibility is that each symbol is equally likely. In the preferred embodiment of the invention, certain symbols (symbols that match either their left or upper neighbors) are considered more likely than others. Then, as symbols are encountered, the probability values for the symbols are dynamically updated to reflect the changing probabilities.

For example, consider again the message "DCDACBD-CDB" above. Initially, each of the four symbols "A," "B," "C," and "D" can be assigned the same probability of 25%. This can be accomplished in many ways: for example, it can be preliminarily assumed that each symbol was encountered once for purposes of defining the initial probabilities. Then, as the symbols are encountered, the counts for the symbols can be updated. So, after the first symbol ("D") is encountered, its probability value can be updated to 40% (2 out of 5), with each of the other symbols reduced to 20% (1 out of 5). After the next symbol ("C") is encountered, the probability values for symbols "A" and "B" reduces to 16.67% (1 out of 6 for each), and the probability values for symbols "C" and "D" are changed to 33.33% (2 out of 6 for each). And so on.

Using dynamic probability values improves the speed of the encoding technique. To compute the static probability values requires either selecting random probability values that may have no bearing on the actual message, or scanning the message to determine the probability values of the individual symbols in the message. Selecting random probability values can result in poor encoding; scanning the message requires performing two passes over the message (one to determine the probability values, and one to encode the message). With dynamic probability values, both disadvantages are avoided. The probability values become accurate for the message, but only one pass is needed over the message (both to encode the message and to update the dynamic probability values).

Figure 7:
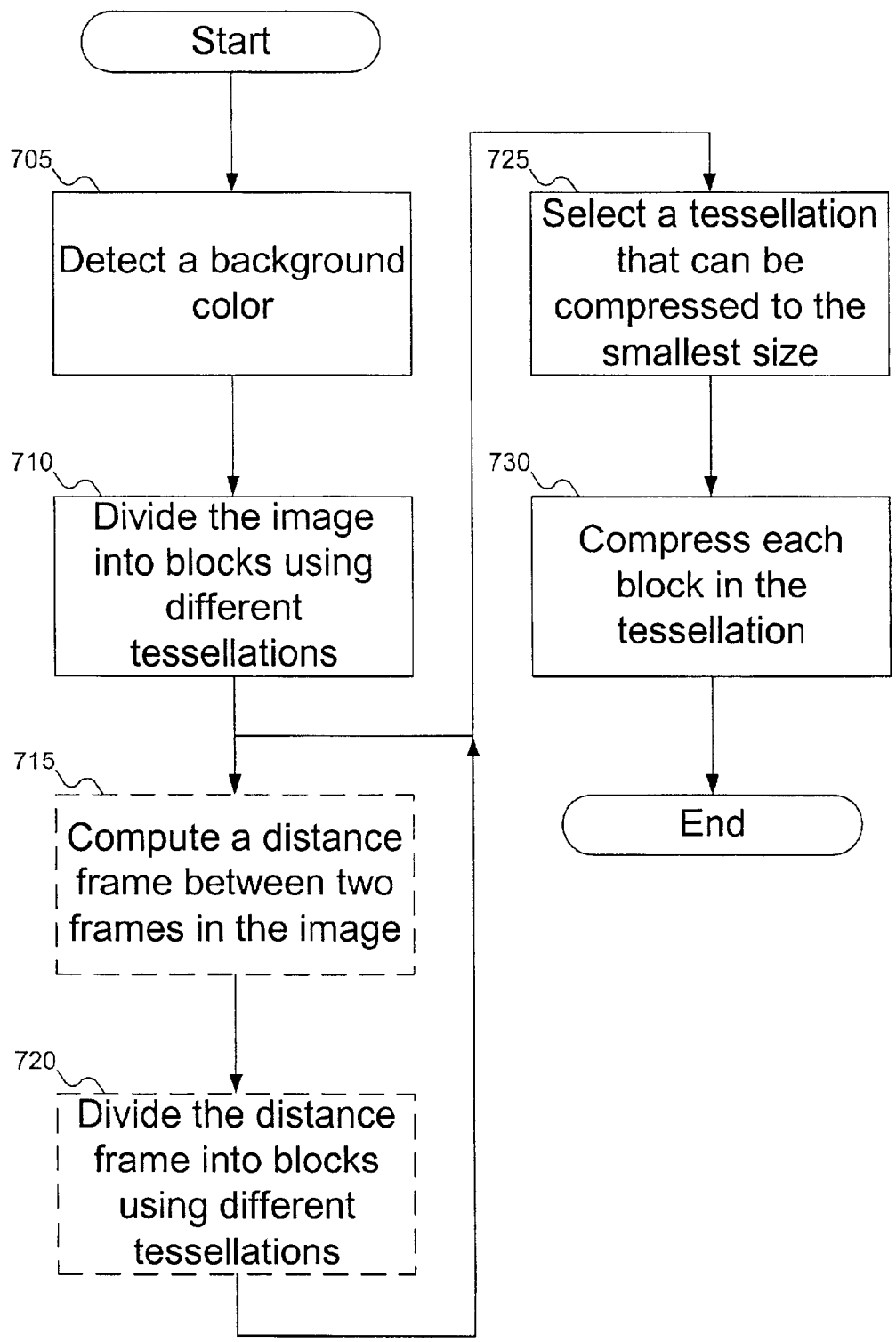
FIG. 7 shows the procedure used to divide the image of FIG. 2 into boxes for compression on the computer system of FIG. 1A.

FIG. 7 shows the procedure used to divide the image of FIG. 2 into boxes for compression on the computer system of FIG. 1A. At step 705, a background color is determined for the image. This is usually done by analyzing the colors of the pixels on the border of the image. At step 710 the image is divided into blocks. As described above with reference to FIG. 4A, in the preferred embodiment rectangular blocks are used. But any tessellation (division of the plane) can be used, provided that no pixel is included in more than one block, and that each pixel with a color different from the background color is included in a block. Steps 715 and 720 are applicable only for animated images that include multiple frames. Step 715 computes the distance frame between two frames in the animated image, and step 720 computes tessellations of the distance frame. In both steps 710 and 720, multiple tessellations can be considered to find a tessellation that results in the smallest compressed image size. Once multiple tessellations have been analyzed, at step 725 the tessellation that results in the smallest compressed file size is selected, and then each block in the tessellation is compressed. Note that only the blocks need to be compressed: the remaining pixels include only the background color, which can be very easily identified.

Figure 8:
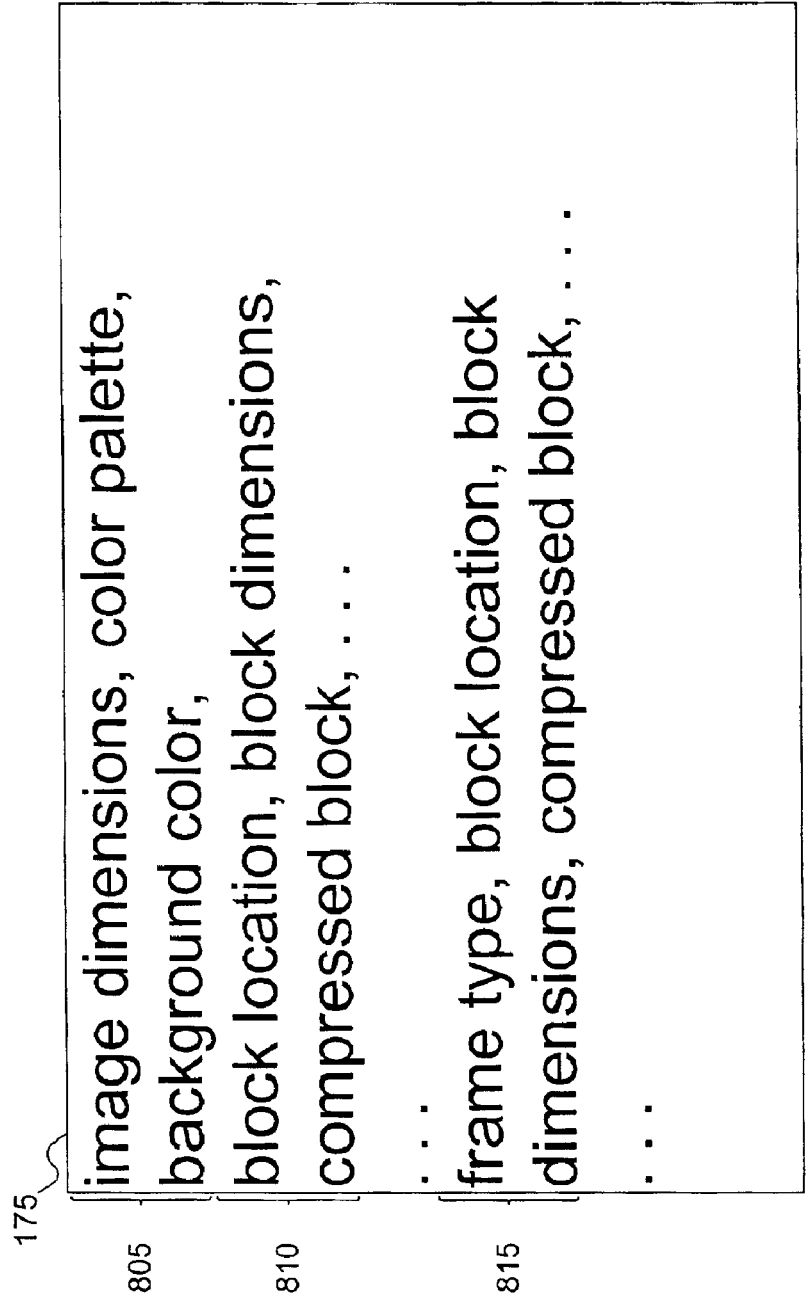
FIG. 8 shows a structure for an image file compressed according to the preferred embodiment of the invention.

FIG. 8 shows a structure for compressed image file 175 according to the preferred embodiment of the invention. In FIG. 8, the structure used for storing and for transmitting compressed image file 175 begins with preliminary information 805. Preliminary information 805 is sent once per image, and specifies the size of the image (typically in two pixel dimensions: for example, 640×480), the color palette (typically as a table or a list of indices to color values), and the background color of the image (typically as an index into the color palette). Next comes block information 810. Block information 810 specifies the location, size, and contents of a particular block in the compressed image file. The contents of the block are the compressed indices into the color palette for each pixel in the block. (In the preferred embodiment, pixels in each block are examined row by row, from the top of the block to the bottom, and within each row from left to right. However, a person skilled in the art will recognize that pixels can be scanned in other orders as well.) For example, referring back to FIG. 4A, block information 810 can specify the location, size, and contents of box 415. Block information 810 can be repeated if there are multiple blocks in the image.

If the image is an animated image, then frame information 815 can be provided. Frame information 815 specifies the type of frame (for example, the frame can be completely redrawn without reference to the prior frame, or the frame can be a distance frame, as described above) and the information about the frame. The information about the frame can include one or more blocks, as described above. Preliminary information need not be resent until the next image. However, a person skilled in the art will recognize that some preliminary information (for example, a new color palette) can be sent, if desired.

Note that in nowhere in FIG. 8 is the structure of compressed image file 175 described as including the model (s) used in compression. The reason the models are not included in compressed image file 175 is that the models do not need to be stored. Instead, the models can be reconstructed as compressed image file 175 is read. For example, if when the image is compressed a particular pixel has the same color as its left and upper neighbors, the index into the color palette stored in the compressed image file will reflect this. Thus, the models can be reconstructed when compressed image file 175 is read, and do not need to be stored in compressed image file 175. This is an advantage over Huffman codes, which must be stored with the image file.

Figure 9A:
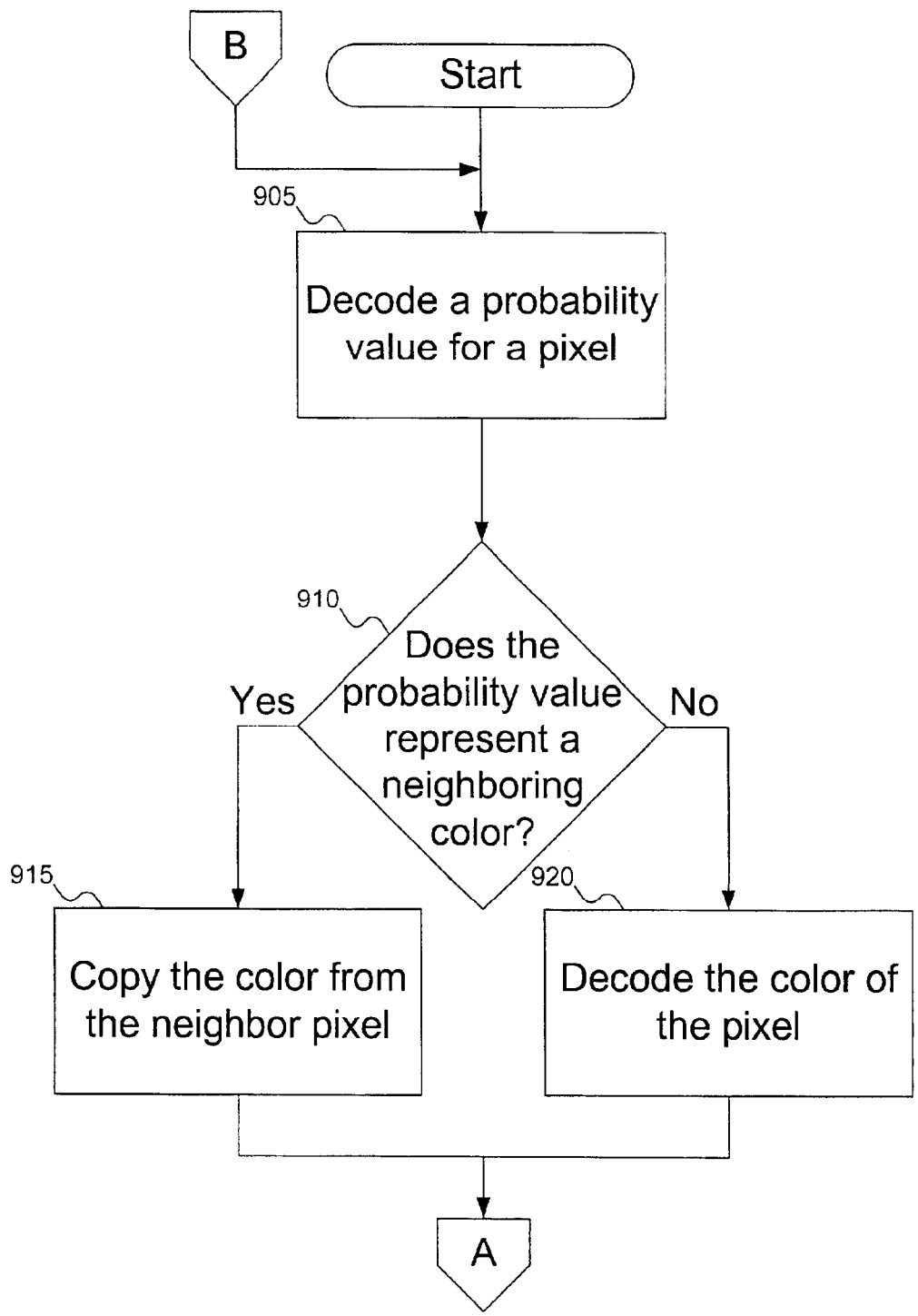
FIGS. 9A and 9B show the procedure used to decompress the image file of FIG. 2 on the computer system of FIG. 1A.
Figure 9B:
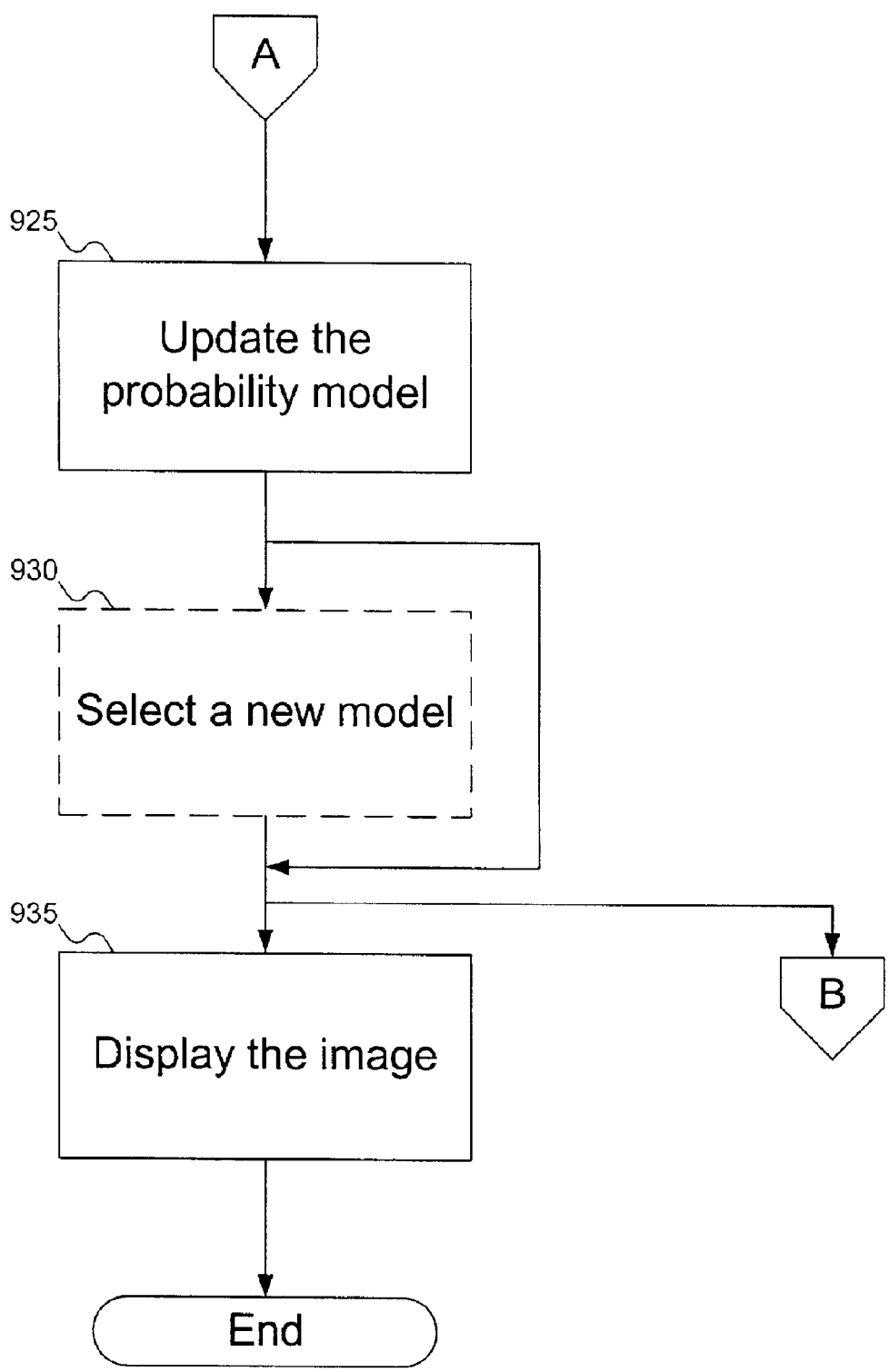
Figure 10:
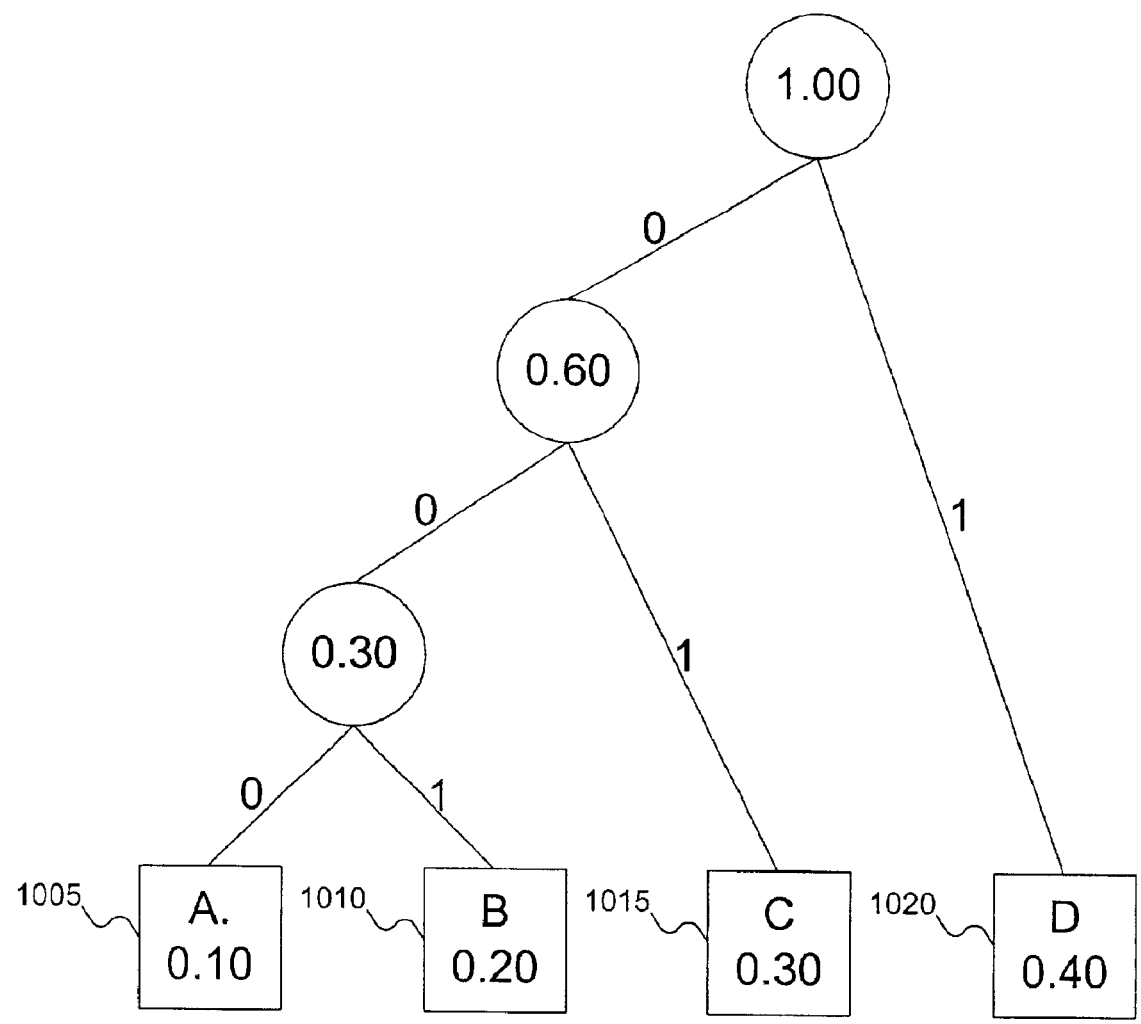
FIG. 10 shows a Huffman coding tree according to the prior art.

FIGS. 9A and 9B show the procedure used to decompress compressed image file 175 of FIG. 2 on the computer system of FIG. 1A. At step 905 (FIG. 9A), the probability value for the current pixel is decoded. At step 910, the probability value is analyzed to determine whether the color of the current pixel is supposed to be the same as either the left or upper neighbor of the current pixel. If the current pixel is the same color as either the left or upper neighbor of the current pixel, then at step 915 the color of the current pixel is copied from the left or upper neighbor, as appropriate, of the current pixel. Otherwise, at step 920, the color of the current pixel is decoded from the compressed image file. At step 925 (FIG. 9B), the probability model is updated, and if necessary, at step 930 a new probability model is selected. Then, if more pixels remain to be decoded, the process returns to step 905. Otherwise, at step 935, the decompressed image is displayed.

Regarding step 930, as discussed above with reference to FIG. 3, the use of different probability models helps to improve the compression by focusing each probability model on a different probability value. For example, consider probability model 305, and assume that the current pixel and its left and upper neighbors have the same color. Because the current pixel had the same color as its left and upper neighbors, the compression technique expects that the next pixel will have the same color as its left and upper neighbors. If this expectation is satisfied, probability value 305-1 will be further increased, as opposed to any of probability values 305-2, 305-3, 305-4, and 305-5. In range coding, the bigger the available range, the fewer the number of bits necessary to compress the message. Thus, by focusing each probability model on a different combination of the colors of the current pixel and its left and upper neighbors, the probability models are able to compress the image using fewer bits, resulting in better compression than would otherwise occur.

The decompressor is able to decompress compressed image file 175 without reading the probability models from compressed image file 175 because the decompressor is able to recreate the probability models on the fly. Like the compressor, the decompressor starts with initial probability models, the same as shown in FIG. 3. As the decompressor reads the compressed information from compressed image file 175, it can update the probability models in the same way as the compressor did when the compressor compressed image file 130. In this way, the compressor/decompressor resembles Lempel-Ziv compression. In the Lempel-Ziv compression, the compressor and decompressor build dictionaries as the file is read for compression/decompression. Although the instant invention does not use a dictionary, the probability models can be built by both the compressor and decompressor as they read the image file and the compressed file, respectively.

A person skilled in the art will recognize that the method and apparatus for compression described herein provides for lossless compression. That is, the image file is compressed with no loss of information. When compressed image file 175 is decompressed, the resulting file contains the same information as was in image file 130, before the compression occurred.

Appendix A shows an implementation of the compression algorithm described herein. In Appendix A, the comments describe a preferred embodiment of the algorithm implemented in the source code. The comments in Appendix A can be thought of as pseudo-code. Although exemplary, a person skilled in the art will recognize that other implementations and variations on the implementation shown are possible.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

APPENDIX A

```
/*
 * (C) Copyright 2000 by OnMercial.com, Inc.
 * All rights reserved
 *
 * General pixel encoding routine.
 *
 * The routine ac_out is a standard range encoder. The routine Update-
Model
 * is responsible for updating the model to reflect the new probability
 * values given the color of the current pixel.
 */
int AmfCoder::encode(int a_y, int a_x) {
/*
 * pc is the index into the color palette for the current pixel.
 * pl is the index into the color palette for the left neighbor pixel.
 * plu is the index into the color.palette for the upper neighbor pixel.
 * ptr is a two-dimensional array storing the indices into the color
 *     palette in the image.
 */
  int pc;
  int pl;
  int pu;
  int ptr;
/*
 * Identify the index into the color palette for the current pixel.
 */
  pc=(*frame)(a_x,a_y);
/*
 * Assert the proposition that the index into the color palette for the
 * current pixel is a valid index (i.e., not out of bounds).
 */
  assert(pc<pal_size+1);
/*
 * Identify the indices into the color palette for the upper neighbor.
 */
```

APPENDIX A-continued

```
        if(a_y>frame->y0) {
            pu=(*frame)(a_x,a_y-1);
        } else {
/*
 * Use the index in the color palette for the transparent color to indicate
 * that the current pixel is in the top row of the image.
 */
            pu=pal_size;
        }
/*
 * Identify the indices into the color palette for the left neighbor.
 */
        if(a_x>frame->x0) {
            pl=(*frame)(a_x-1,a_y);
        } else {
/*
 * Use the index in the color palette for the transparent color to indicate
 * that the current pixel is in the top row of the image.
 */
            pl=pal_size;
        }
/*
 * Encode the current pixel.
 *
 * Mode 1: The left and upper pixels have the same color.
 */
        if (pu==pl) {
/*
 * Determine the proper offsets into the frq_eq array for the current
 * probability model.
 */
            ptr=3*context;
/*
 * Mode 1a: The current pixel has the same color as the left and upper
 * neighbors.
 */
            if (pl==pc) {
/*
 * Encode the mode and update the model.
 */
                coder->ac_out(frq_eq[ptr+0],frq_eq[ptr+1],frq_eq[ptr+2]);
                UpdateModel(ptr+frq_eq,2,0,ALEVEL);
/*
 * Select the proper model for the next pixel.
 */
                context=0;
/*
 * Mode 1b: The current pixel has a different color than the left and upper
 * neighbors.
 */
            } else {
/*
 * Encode the mode and the index into the color palette for the current
 * pixel, and update the model.
 */
                coder->ac_out(frq_eq[ptr+1],frq_eq[ptr+2],frq_eq[ptr+2]);
                encode_0(pl,pl,pc);
                UpdateModel(ptr+frq_eq,2,1,ALEVEL);
/*
 * Select the proper model for the next pixel.
 */
                context=1;
            }
/*
 * Mode 2: The left and upper pixels have different colors.
 */
        } else {
/*
 * Determine the proper offsets into the frq_ne array for the current
 * probability model.
 */
            ptr=4*context;
/*
 * Mode 2a: The current pixel has the same color as the left neighbor
 only.
 */
            if (pl == pc) {
/*
 * Encode the mode and update the model.
 */
                coder->ac_out(frq_ne[ptr+0],frq_ne[ptr+1],frq_ne[ptr+3]);
                UpdateModel(ptr+frq_ne,3,0,ALEVEL2);
/*
 * Select the proper model for the next pixel.
 */
                context=2;
/*
 * Mode 2b: The current pixel has the same color as the upper neighbor
 * only.
 */
            } else if (pu == pc) {
/*
 * Encode the mode and update the model.
 */
                coder->ac_out(frq_ne[ptr+1],frq_ne[ptr+2],frq_ne[ptr+3]);
                UpdateModel(ptr+frq_ne,3,1,ALEVEL2);
/*
 * Select the proper model for the next pixel.
 */
                context=3;
/*
 * Mode 2c: The current pixel has a different color than the left and upper
 * neighbors.
 */
            } else {
/*
 * Encode the mode and the index into the color palette for the current
 * pixel, and update the model.
 */
                coder->ac_out(frq_ne[ptr+2],frq_ne[ptr+3],frq_ne[ptr+3]);
                UpdateModel(ptr+frq_ne,3,2,ALEVEL2);
                encode_0(pl,pu,pc);
/*
 * Select the proper model for the next pixel.
 */
                context=4;
            }
        }
        return 0;
}
/*
 * Encoding routine for encoding the current pixel when the current pixel
 * has a color different from both the left and upper neighbors.
 */
int AmfCoder::encode_0(int a_l, int a_u, int a_c) {
/*
 * xl marks the low end of the range of probability values for a color
 *    in the color palette.
 * xh marks the high end of the range of probability values for a color
 *    in the color palette.
 * xtot stores the total number of occurrences of each color in the
 * color palette.
 */
    U16B xl;
    U16B xh;
    U16B xtot;
    U16B i;
/*
 * Initialize the low end of the range of probability values for the first
 * color in the color palette.
 */
    xl=0;
/*
 * Calculate the total number of occurrences of each color in the color
 * palette.
 */
    xtot=frq_0[pal_size+1];
/*
 * Exclude from the total number of occurrences of each color in the color
 * palette the number of occurrences of the colors of the left and upper
 * neighbors.
 */
    xtot -= frq_0[a_l];
/*
 * Only exclude the number of occurrences of the color of the upper
 * neighbor if it is different from the color of the left neighbor (i.e.,
 * we are not in mode 1).
 */
```

APPENDIX A-continued

```
    if (a_l !=a_u) {
        xtot -= frq_0[a_u];
    }
/*
 * Scan through the colors in the color palette.
 */
    for (i=0;i<pal_size+1;i++) {
/*
 * Ignore the colors or the left and upper neighbors.
 */
        if (i==a_l || i==a_u) {
          continue;
        }
/*
 * Set the high end of the range of probability values for the current
 * color to be the low end of the range of probability values for the
 * current color plus the number of occurrences of the current color.
 */
        xh=xl+frq_0[i];
/*
 * If the current color is that of the current pixel, encode the current
 * color and update the model (including the number of occurrences of
 * each color in the color palette).
 */
        if (i==a_c) {
          coder->ac_out(xl, xh, xtot);
          UpdateModel2(frq_0,(U16B)(pal_size+1),i,ALEVEL0);
/*
 * Break out of the for-loop.
 */
          break;
        }
/*
 * Set the low end of the range of probability values for the next color to
 * be the high end of the range of probability values for the current
 * color.
 */
        xl=xh;
    }
    return 0;
}
```

What is claimed is:

1. A method for compressing an indexed color image on a computer, the method comprising:
   identifying a pixel color for a pixel;
   identifying a left neighbor color for a left neighbor of the pixel;
   identifying an upper neighbor color for an upper neighbor of the pixel;
   comparing the pixel color with the left neighbor color and the upper neighbor color;
   selecting a probability model from a probability set, the probability set including at least two probability models, each probability model including at least two probabilities for the pixel color;
   encoding the pixel color based on the comparison using the probability model; and
   updating the probability model.

2. A method according to claim 1, the method further comprising encoding the left neighbor color for the left neighbor of the pixel and the upper neighbor color for the upper neighbor of the pixel according to the probability model.

3. A method according to claim 1, wherein updating the model includes changing a probability value regarding the relationship between the pixel color and the left neighbor color and the upper neighbor color.

4. A method according to claim 1, wherein encoding the pixel color includes encoding the pixel color based on the comparison using a probability value in the probability model regarding the relationship between the pixel color and the left neighbor color and the upper neighbor color.

5. A method according to claim 4, wherein encoding the pixel color further includes selecting one of a plurality of probability values in the probability model regarding the relationship between the pixel color and the left neighbor color and the upper neighbor color.

6. A method according to claim 4, wherein encoding the pixel color further includes selecting an index from a color palette according to the results of comparing the pixel color to the left neighbor color and the upper neighbor color.

7. A method according to claim 6, wherein encoding the pixel color further includes compressing the selected index from the color palette.

8. A method according to claim 4, wherein encoding the pixel color further includes encoding the probability value.

9. A method for compressing an indexed color image on a computer, the method comprising:
   detecting a background color of the image;
   selecting a part of the image that includes a color other than the background color, the selected part of the image including at least two pixels;
   dividing the selected part of the image into at least two tessellations of blocks, each tessellation of blocks including at least one block, wherein each block includes at least one pixel with a color other than the background color and each pixel in the image with a color other than the background color is included in exactly one block in each tessellation;
   estimating a size for each tessellation, wherein each block in each tessellation is compressed separately;
   selecting a tessellation with a smallest estimated size; and
   compressing each block in the selected tessellation separately.

10. A method according to claim 9, wherein compressing the selected part of the image includes:
    locating at least one block in the image that includes a pixel with a color other than the background color; and
    compressing each block separately.

11. A method according to claim 9, wherein compressing the selected part of the image includes storing a location, a size, and a color for the part of the image when the part of the image includes pixels with only a single color.

12. A method for decompressing an indexed color image on a computer, the method comprising:
    decoding a probability value for a compressed color for a pixel;
    selecting a probability model from a probability set, the probability set including at least two probability models, each probability model including at least two probabilities for the pixel color;
    determining whether the probability value represents the same color as a left neighbor color for a left neighbor of the pixel or an upper neighbor color for an upper neighbor of the pixel using the probability model;
    decoding an uncompressed color for the pixel; and
    updating the probability model.

13. A method according to claim 12, wherein updating the model includes changing the probability value in the probability model regarding the relationship between the compressed color and the left neighbor color and the upper neighbor color.

14. A method according to claim 12, wherein determining whether the probability value represents the same color includes using the probability value in the probability model regarding the relationship between the compressed color and the left neighbor color and the upper neighbor color.

15. A method according to claim 14, wherein using the probability value includes selecting one of a plurality of probability values regarding the relationship between the compressed color and the left neighbor color and the upper neighbor color.

16. A method according to claim 12, wherein decoding an uncompressed color includes selecting an index from a color palette according to whether the compressed color represents the same color as the left neighbor color or the upper neighbor color.

17. A method according to claim 16, wherein selecting an index from a color palette includes decoding the selected index when the compressed color is determined to be different from the left neighbor color and the upper neighbor color.

18. A computer-readable medium containing a program to compress an indexed color image on a computer, the program comprising:

identification software to identify a pixel color for a pixel;

identification software to identify a left neighbor color for a left neighbor of the pixel;

identification software to identify an upper neighbor color for an upper neighbor of the pixel;

comparison software to compare the pixel color with the left neighbor color and the upper neighbor color;

selection software to select a probability model from a probability set, the probability set including at least two probability models, each probability model including at least two probabilities for the pixel color;

encoding software to encode the pixel color based on the comparison using the probability model; and updating software to update the probability model.

19. A computer-readable medium containing a program according to claim 18, wherein the updating software includes changing software to change a probability value regarding the relationship between the pixel color and the left neighbor color and the upper neighbor color.

20. A computer-readable medium containing a program according to claim 18, wherein the encoding software includes selection software to select one of a plurality of probability values in the probability model regarding the relationship between the pixel color and the left neighbor color and the upper neighbor color.

21. A computer-readable medium containing a program according to claim 18, the program designed to store the compressed indexed color image in a data structure in memory, the data structure including:

dimensions for the image;

a color palette for the image;

a background color of the image; and at least one compressed block, the compressed block including a location for the block, dimensions for the block, and at least one pixel compressed using a dynamic probability model.

22. A computer-readable medium containing a program to compress an indexed color image on a computer, the program comprising:

detection software to detect a background color of the image;

selection software to select a part of the image that includes a color other than the background color, the selected part of the image including at least two pixels;

division software to divide the selected part of the image into at least two tessellations of blocks, each tessellation of blocks including at least one block, wherein each block in each tessellation includes at least one pixel with a color other than the background color and each pixel in the image with a color other than the background color is included in exactly one block in each tessellation;

estimation software to estimate a size for each tessellation, wherein each block in each tessellation is compressed separately;

selection software to select a tessellation with a smallest estimated size; and compression software to compress each block in the selected tessellation separately.

23. A computer-readable medium containing a program according to claim 22, the program designed to store the compressed indexed color image including at least two frames in a data structure in memory, the data structure including:

dimensions for the image;

a color palette for the image;

a background color of the image;

at least one compressed block, the compressed block including a location for the block, dimensions for the block, and at least one pixel compressed using a dynamic probability model; and a frame marker indicating whether or not one of the frames is a distance frame.

24. A computer-readable medium containing a program to decompress an indexed color image on a computer, the program comprising:

decoding software to decode a probability value for a compressed color for a pixel;

selection software to select a probability model from a probability set, the probability set including at least two probability models, each probability mode including at least two probabilities for the pixel color;

determination software to determine whether the probability value represents the same color as a left neighbor color for a left neighbor of the pixel or an upper neighbor color for an upper neighbor of the pixel using the probability model;

decoding software to decode an uncompressed color for the pixel; and updating software to update the probability model.

25. A computer-readable medium containing a program according to claim 24, wherein the updating software includes changing software to change the probability value in the probability model regarding the relationship between the compressed color and the left neighbor color and the upper neighbor color.

26. A computer-readable medium containing a program according to claim 24, wherein the determination software includes modeling software operable in accordance with the probability model to use the probability value in the probability model regarding the relationship between the compressed color and the left neighbor color and the upper neighbor color.

27. A computer-readable medium containing a program according to claim 24, wherein the decoding software includes selection software to select an index from a color palette according to whether the compressed color represents the same color as the left neighbor color or the upper neighbor color.

28. A computer-readable medium containing a program according to claim 27, wherein the selection software includes decoding software to decode the selected index when the compressed color is determined to be different from the left neighbor color and the upper neighbor color.

29. An apparatus comprising:

a computer including a processor and a memory;

an indexed color image loaded in the memory of the computer;

a color palette specifying colors in the image;

a probability set, including at least two probability models, each probability model including at least two probability values for a color of a pixel given a color of a left neighbor of the pixel and a color of an upper neighbor of the pixel;

selection means to select the probability model from the probability set;

an update module designed to update the probability value in the probability model given the color of the pixel, the color of the left neighbor of the pixel, and the color of the upper neighbor of the pixel; and a compressor designed to compress the color of the pixel using the color palette.

30. An apparatus according to claim 29, wherein:

the image includes a first frame and a second frame; and the apparatus further comprises a distance frame generator for generating a distance frame between the first and second frames of the image.

31. An apparatus according to claim 29, wherein:

the image includes a background color; and the apparatus further comprising a block locator for locating a block in the image, the block including at least one pixel with a color other than the background color and at least a second pixel.

32. An apparatus according to claim 29, the apparatus further comprising a size estimator designed to estimate the size of the compressed image using a division of the image.

33. An apparatus according to claim 29, the apparatus further comprising decompression means for decompressing a compressed image compressed on the computer.

34. An apparatus according to claim 33, wherein:

the decompression means are operable on a second computer; and the apparatus further comprises transmission means for transmitting the compressed image from the computer to the second computer.

35. A memory for storing a compressed image file for access by an application program being executed on a computer, comprising:

a data structure stored in said memory, said data structure including:

dimensions for the image;

a color palette for the image;

a background color of the image; and at least one compressed block, the compressed block including a location for the block, dimensions for the block, and at least one pixel compressed using a dynamic probability model, the compressed block including a subset of pixels in the image which consists of less than all pixels in the image.

36. A memory according to claim 35, wherein:

the image includes at least two frames; and the data structure further includes a frame marker indicating whether or not one of the frames is a distance frame.

37. A method for compressing an indexed color image on a computer, the method comprising:

detecting a background color of the image;

selecting a part of the image that includes a color other than the background color;

dividing the image into at least two tessellations of blocks, each tessellation of blocks including at least one block, wherein each block includes at least one pixel with a color other than the background color and each pixel in the image with a color other than the background color is included in exactly one block in each tessellation;

estimating a size for each tessellation, wherein each block in each tessellation is compressed separately;

computing a distance frame between a first frame and a second frame of the image;

dividing the distance frame into at least two tessellations of blocks, each tessellation of blocks including at least one block, wherein each block includes at least one pixel with a color other than the background color and each pixel in the distance frame with a color other than the background color is included in exactly one block in each tessellation;

estimating a size for each tessellation of the distance frame, wherein each block in each tessellation is compressed separately;

selecting a tessellation from the tessellations of the image and the tessellations of the distance frame with a smallest estimated size; and compressing each block in the selected tessellation separately.

38. A computer-readable medium containing a program to compress an indexed color image on a computer, the program comprising:

detection software to detect a background color of the image;

selection software to select a part of the image that includes a color other than the background color;

division software to divide the image into at least two tessellations of blocks, each tessellation of blocks including at least one block, wherein each block includes at least one pixel with a color other than the background color and each pixel in the image with a color other than the background color is included in exactly one block in each tessellation;

estimation software to estimate a size for each tessellation, wherein each block in each tessellation is compressed separately;

distance computing software to compute a distance frame between a first frame and a second frame of the image;

division software to divide the distance frame into at least two tessellations of blocks, each tessellation of blocks including at least one block, wherein each block includes at least one pixel with a color other than the background color and each pixel in the distance frame with a color other than the background color is included in exactly one block in each tessellation;

estimation software to estimate a size for each tessellation of the distance frame, wherein each block in each tessellation is compressed separately;

selection software to select a tessellation from the tessellations of the image and the tessellations of the distance frame with a smallest estimated size; and compression software to compress each block in the selected tessellation separately.

39. An apparatus comprising:

a computer including a processor and a memory;

an indexed color image loaded in the memory of the computer;

a color palette specifying colors in the image;

a probability model predicting a probability value of a color of a pixel given a color of a left neighbor of the pixel and a color of an upper neighbor of the pixel;

an update module designed to update the probability value in the probability model given the color of the pixel, the color of the left neighbor of the pixel, and the color of the upper neighbor of the pixel;

a size estimator designed to estimate the size of the compressed image using a division of the image;

selection means to select a division of the image based on the estimated size of a plurality of divisions of the image; and a compressor designed to compress the color of the pixel using the color palette.

40. An apparatus according to claim 39, wherein the selection means is further designed to select the division of the image based on the estimated size of the plurality of divisions of the image and the estimated size of a plurality of divisions of a distance frame between a first frame and a second frame of the image.

* * * * *